Patented May 3, 1949

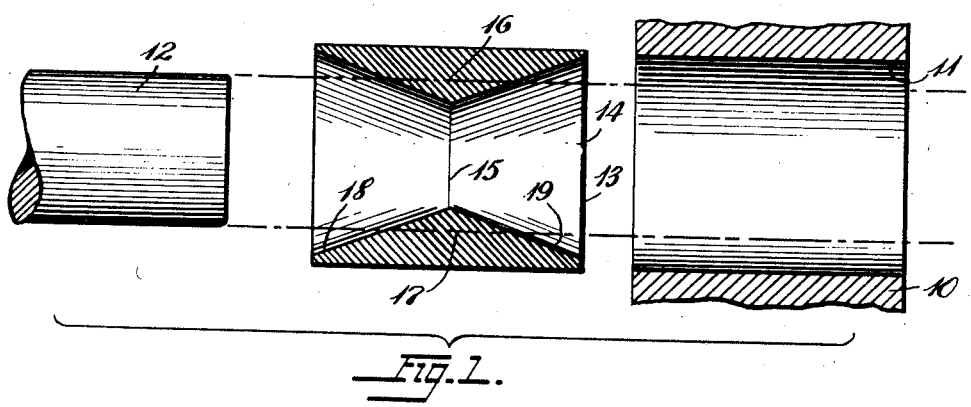
Fig. 1.
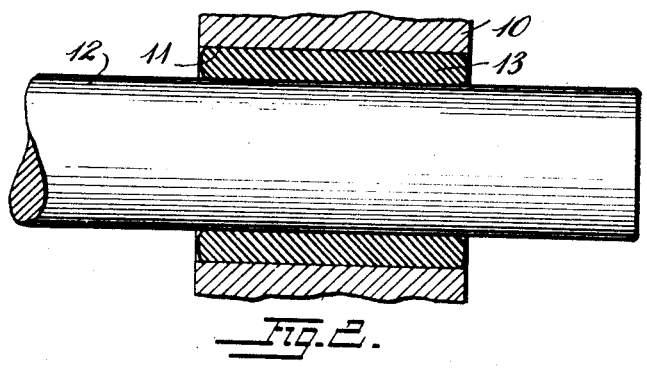
Fig. 2.
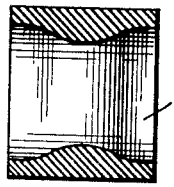  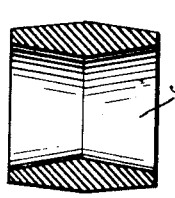 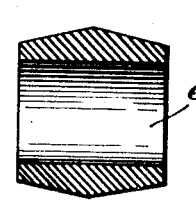
Fig. 3.  Fig. 4.  Fig. 5.  Fig. 6.
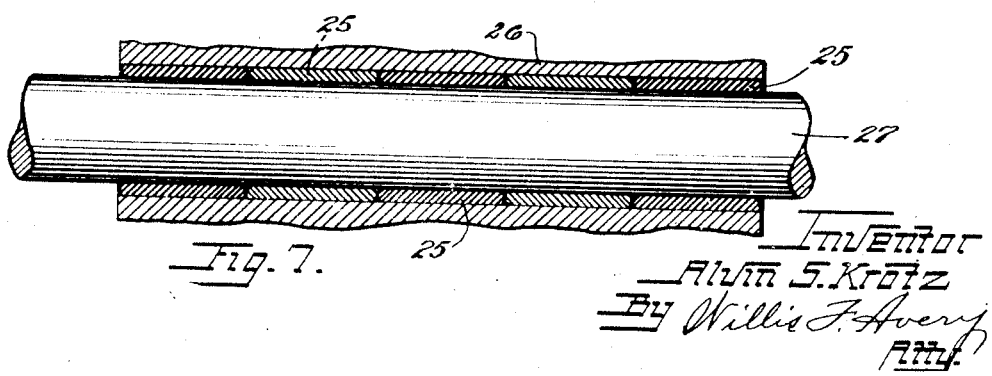
Fig. 7.
Inventor
Alvin S. Krotz
By Willis F. Avery
Atty.

2,468,985

UNITED STATES PATENT OFFICE 2,468,985

RESILIENT CONNECTION AND METHOD OF MAKING SAME

Alvin S. Krotz, Akron, Ohio, assignor to The B. F. Goodrich Company, New York, N. Y., a corporation of New York Application November 26, 1943, Serial No. 511,775

10 Claims. (Cl. 287—85)

This invention relates to resilient connections.

In the cushioning of members with respect to their surrounding housings the provision of molded cushioning bodies of resilient rubber or other rubber-like material and the mounting of such bodies in place has presented certain difficulties. In many cases the size and shape of the inner members and the surrounding housings has made it difficult to mold and vulcanize the resilient bodies in situ. Shrinkage of the rubber during or after vulcanization has tended to place the bushings in a state of objectionable tension and it has been difficult to bond the resilient material to the inner member and the housing.

Where it has been attempted to form a resilient body separately and then assemble the parts, displacement of the resilient material during the assembling operation has in the prior constructions often caused an objectionably elongated condition of the resilient body together with an undesirable tensioning of the material at the ends of the body, which has been conducive to rapid deterioration of the resilient material.

The present invention aims to overcome the foregoing and other difficulties.

The principal objects of the invention are to provide one or more independently formed resilient bodies or bushings adapted to be assembled under compression with an inner element and a housing without substantial increase of axial dimension of the resilient structure and to provide this in connections of short length and long length; to provide for added compression of the resilient material at a position where slippage may occur, to provide for increasing resistance of the resilient material to wear, to provide this result through reversal of an annular resilient bushing, and to facilitate construction and assembly.

These and other objects will appear from the following description and the accompanying drawings.

Of the drawings,

Fig. 1 is a sectional view showing the unassembled parts of the cushioning assembly, the bushing being in its unstressed molded form.

Fig. 2 is a sectional view showing the parts of Fig. 1 after assembly.

Fig. 3 is a sectional view of a modified form of resilient bushing.

Fig. 4 is a similar view of another modified form of resilient bushing.

Fig. 5 is a similar view of still another modified form of resilient bushing.

Fig. 6 is a similar view of a bushing adapted to be used in reversed condition, the bushing being shown in its molded form.

Fig. 7 is a sectional view of a connection having a plurality of resilient bushings.

Referring to the drawings, and first to Figs. 1 and 2, thereof, the spring assembly illustrated in Fig. 2 comprises an outer housing 10 of metal or other difficulty deformable material having a bore 11 formed therein. The inner element is designated by the numeral 12 and is also of metal or other difficultly deformable material, the inner element being illustrated as a cylindrical shaft or similar element. Between the inner element 12 and the housing 10 within the bore 11 is a resilient bushing 13 of soft vulcanized rubber or other rubber-like material under radial compression. The length of the bushing under radial compression may be substantially the same as the length of the bore 11, or it may be less or greater than the length of the bore, if desired.

Referring to Fig. 1, in which the parts are shown before assembly, the bushing 13 is shown as having a uniform outer diameter equal to or less than the bore 11 of the housing 10, and having a bore 14 of less diameter at its midportion 15 than the diameter of the inner element or shaft 12 and of greater diameter at its ends than the diameter of the shaft. The bushing is so proportioned that the volume of material falling within the projected area of the shaft 12 as indicated by the dot and dash lines 16, 17 is equal to the volume of the annular spaces 18, 19 between the projected shaft area and the flared bore of the bushing. The arrangement is such that the bushing 13 may be entered freely in the bore 11 and the shaft 12 may then be forced therethrough, being lubricated if desired for decreasing friction. Preferably the end of the shaft is chamfered, as shown, to facilitate the insertion. The bushing material within the projected area of the shaft is displaced radially and, being substantially incompressible in volume, is displaced axially to fill the spaces 18, 19 without substantially increasing the length of the bushing. The friction of the tensioned bushing against the shaft and the housing is not sufficient to prevent slippage under all torsional forces applied thereto but is sufficient to provide considerable resistance to slippage such as to permit some movement in torque before slippage occurs. Further relative rotation of the inner and outer members is accommodated through slippage. The bushing is at all times effective to cushion radial deflections.

Where long bushing assemblies are required a plurality of bushings 25, like the bushing 13, may be inserted in succession in the bore of the housing 26, as shown in Fig. 7 with their ends preferably abutting each other and a single inner or shaft element 27 may be forced through the assembly, the spaces 18, 19 of each bushing providing for displacement of the material of the bushing without extending its length. The spaces 18, 19 also provide a space for receiving a lubricant to assist in entering the shaft.

This construction provides a more nearly uniform condition of radial compression along the connection than if but a single long bushing were used and tension in the exposed ends of the bushings is reduced or eliminated. Thus, the construction is advantageous especially in connections of long length, although, it is useful in any case where radial compression is desired without substantial increase in the length of the bushing.

The bushing 13 shown in Figs. 1 and 2 has a bore which is formed by opposed truncated cones. The bushing 30 shown in Fig. 3 is also of less internal dimension at its center than at its ends but has an inner surface which in axial section is convex at its center and concave at its ends.

In the bushing 40 illustrated in Fig. 4, the bore is greater at the ends than at the center but the wall surface thereof is convexly curved from one end to the other.

In the modified form of bushing 50 shown in Fig. 5, both the inner and outer surfaces are defined by opposed truncated cones so that the outer surface is of larger dimension at the center than at the ends and the inner wall provides a bore of less diameter at its center than at the ends. Such a bushing may be of such dimensions as to just pass through the bore of the support or may be forced thereinto under slight compression before the inner element or shaft is forced therethrough.

In all of the bushings illustrated the tapered walls provide for displacement of the cushioning material under radial compression at the center thereof without substantial axial elongation of the bushing provided that the bores are so proportioned as to be smaller than the shaft at a position between the ends of the bushing and larger than the shaft at the ends of the bushing with the volume of material within the axially projected area of the shaft no greater than the annular end spaces outside the axially projected area of the shaft. While the bushings have been shown as complete annuli, each bushing may be made of segments assembled in annular form or of one split bushing if desired.

Referring to Fig. 6, this shows a bushing of resilient material having a uniform bore and having a greater outside dimension at a midportion and reduced outer dimensions at its ends. Such a bushing may be inserted under compression in a housing having a uniform bore and will then present a bore flared at the ends due to confinement of its thickened mid-portion. A shaft may then be forced therethrough causing radial compression and deformation in the manner previously described. A bushing of this shape may be molded about a cylindrical core and a plurality of such bushings may be molded about a single core and readily stripped therefrom.

If desired, the bushing of Fig. 6 may be turned inside out before inserting it in the housing. This results in the outer face of the reversed bushing being initially tensioned and the inner face being initially compressed, thus promoting greater resistance to abrasion of the inner face under slippage against the shaft, and thus promoting increased power of the bushing to resist increase in axial length.

Where a plurality of bushings are used between a single housing and a shaft, as in Fig. 7, the bushings may be all of one kind or a variety of bushings of forms such for example as those illustrated may be assembled in one structure.

Also, where a spring structure having a plurality of bushings of resilient material in axial alignment within a single housing and surrounding a single inner element or shaft, as in Fig. 7, is desired, it is also feasible to arrange the bushings so that those at the ends offer greater resistance to distortion due to their composition than the bushings therebetween thereby offering greater resistance in the assembled spring structure to radial displacement of the inner element with relation to the housing. Due to the fact that the bushings are formed separately different compositions or different degrees of vulcanization may be employed and the bushings arranged in any desired arrangement.

Also due to the fact that the bushings are formed separately, the invention presents decided advantages over constructions in which the rubber-like material is vulcanized in situ, in that more simple molding equipment may be employed for making the bushings, the housing and the inner element are not subjected to heating incident to the vulcanizing step, and convenience and flexibility of procedure are enhanced.

The connections may be used in torsion to accommodate turning of the inner element with respect to the housing, or in shear to accommodate axial movement of the inner element with respect to the housing, or for cushioning radial or tilting movements or combinations of these.

The parts may be assembled in any desired manner, whether the bushing be inserted in the housing followed by insertion of the inner element, or the bushing be mounted upon the inner element prior to insertion in the bore. The housing may be continuous about the bore or it may be split or in sections as desired so as to be clamped upon the resilient material to obtain the desired reduction in diameter of the bore and compression of the resilient material.

Variations may be made without departing from the scope of the invention as it is defined by the following claims.

I claim:
1. A resilient connection comprising a housing having a bore, an inner element extending through said bore, and a body of resilient rubber-like material surrounding said element within said bore under radial compression and unadhered to said housing and said element, said body comprising an annular bushing located in said bore, said bushing having a circumferentially substantially uniform wall thickness at its ends less than the radial space between said element and said housing and an annular zone between its ends of circumferentially substantially uniform thickness greater than such radial space and having a bore flared from said annular zone toward said ends, said bushing being adapted to fill the space between said housing and said element for the length of the bushing by distortion of the resilient material in the assembled position of the parts without substantial lengthening of the bushing.

2. A resilient connection comprising a housing having a bore, an inner element extending through said bore, and a body of resilient rubber-like material surrounding said element within said bore under radial compression, said body comprising a bushing having in its unstressed condition a wall of gradually increasing and circumferentially substantially uniform thickness from its ends toward a mid-portion of the bushing defining a passage of greater dimension at its ends than the dimension of said inner element and of less dimension at its mid-portion than the dimension of said inner element, with the volume of resilient material within the axially projected area of said inner element substantially equal to the space between said bushing and said inner element within the length of the unstressed bushing, and said bushing being held between said housing and said element in a state of distortion by slippage of the resilient material at the passage therein to fill said space.

3. In a resilient connection a resilient bushing element positionable between an inner element and the bore of a housing, said bushing element comprising a tubular body of resilient rubber-like material of circumferentially substantially uniform thickness having in its unstressed condition ends of less thickness than the radial space between said inner element and said housing and a mid-portion of greater thickness than said space, said bushing element having a bore flared outwardly from said midportion to said ends, and the material of said mid-portion being displaceable along the inner wall of the bushing toward said ends under radial compression to occupy said space without substantial lengthening of said bushing element.

4. A resilient bushing for disposition between an inner element and the bore of a housing, said bushing comprising an annular vulcanized resilient body of rubber-like material of circumferentially substantially uniform thickness having ends of less thickness than the mid-portion providing a flared bore of less dimension at said mid-portion than at said ends and providing a volume of material along the bore of the bushing toward said ends under radial compression upon assembly with said inner element and housing.

5. A resilient bushing as defined in claim 4 in which the annular vulcanized resilient body is in a condition of circumferential tension of its outer periphery and circumferential compression of its inner periphery as a result of being turned inside out.

6. A resilient bushing for disposition between an inner element and the bore of a housing, said bushing being of resilient rubber-like material of circumferentially substantially uniform wall thickness and having a mid-portion of increased thickness as compared to its ends defining a bore flaring from said mid-portion toward said ends and providing a volume of resilient material displaceable toward the ends of the bushing along said bore under radial compression upon assembly with said inner element and housing.

7. The method of making a resilient connection which comprises providing a housing having a bore and an inner element adapted to extend within said bore in spaced relation thereto, forming a resilient annular body of rubber-like material adapted to enter said bore by telescopic movement and having an axial bore and a wall surrounding its bore of less thickness at its ends than at an intermediate portion, turning said body inside out, assembling said body with said inner element and housing while maintaining contact of the same side of said resilient body with the bore of said housing and displacing material from said intermediate portion toward the ends of said body along the bore of said body.

8. A resilient connection comprising a housing having a bore, an inner element extending through said bore, and an inserted body of resilient rubber-like material surrounding said element in the space within said bore under radial compression and unadhered to said housing and said element, said body comprising an annular molded bushing of substantially greater axial length than radial thickness and being axially non-rolling in said space by virtue of the length-thickness ratio of said bushing, and said bushing being reversed inside-out from its molded form such that it is in a state of compression at its inner periphery and tension at its outer periphery, and said bushing in its relaxed but reversed condition prior to insertion having a circumferentially substantially uniform wall thickness at its ends less than the radial space between said inner element and said housing and a circumferentially substantially uniform thickness greater than said space intermediate said ends, said bushing in its mounted condition substantially filling said space throughout the length of the bushing by distortion of the material thereof from its intermediate portion toward the ends thereof without substantial axial elongation of the bushing, and the compression as a result of said distortion acting together with the compression as a result of said reversed condition at the inner periphery of said bushing in contact with said inner element.

9. A resilient connection as defined in claim 8 in which said bushing comprises one of a plurality of bushings of substantially similar construction and condition of mounting, said bushings being mounted in close proximity axially along said inner member and housing without substantial compression of one bushing against the other in the axial direction, by virtue of the distortion of each bushing without substantial elongation thereof.

10. The method of making a resilient connection which comprises molding an annular bushing of resilient rubber-like material of axial length substantially greater than the radial thickness thereof and of a radial thickness intermediate the ends thereof greater than the radial thickness at said ends, reversing said annular bushing inside out to impose a condition of circumferential compression at the inner periphery of the bushing and a condition of circumferential tension at the outer periphery thereof, and mounting said annular bushing within the space between the bore of a housing and an inner element extending therethrough in which bore the spacing between said inner element and the housing is less than the maximum thickness of said bushing and greater than the thickness of the bushing at the ends of the bushing prior to mounting to compress said bushing radially between said inner element and said housing without axial rolling of the bushing and to distort the material of the bushing toward the ends thereof to effect substantially complete filling of said space between the ends of said bushing substantially without effecting axial elongation of said bushing in said space.

ALVIN S. KROTZ.

(References on following page)

REFERENCES CITED

The following references are of record in the file of this patent:

UNITED STATES PATENTS

| Number | Name | Date |
|---|---|---|
| 1,803,491 | Thiry | May 5, 1931 |
| 1,961,536 | Thiry | June 5, 1934 |
| 2,044,392 | Lord | June 16, 1936 |
| 2,056,257 | Crawford | Oct. 6, 1936 |
| 2,110,783 | Welker | Mar. 8, 1938 |
| 2,249,510 | Welker | July 15, 1941 |
| 2,292,290 | Robins | Aug. 4, 1942 |
| 2,312,579 | O'Brien | Mar. 2, 1943 |
| 2,329,000 | Rembert | Sept. 7, 1943 |

FOREIGN PATENTS

| Number | Country | Date |
|---|---|---|
| 2694/26 | Australia | July 7, 1926 |